United States Patent
Tsuchiya et al.

(10) Patent No.: US 9,452,675 B2
(45) Date of Patent: Sep. 27, 2016

(54) TEMPERATURE ADJUSTMENT STRUCTURE

(71) Applicant: TOYOTA JIDOSHA KABUSHIKI KAISHA, Toyota-shi, Aichi (JP)

(72) Inventors: Takenori Tsuchiya, Toyota (JP); Koichi Nagamine, Toyota (JP); Toyotaka Maeda, Nagoya (JP); Yusuke Katayama, Nagakute (JP); Kazuhiro Nakamura, Naka-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/773,521

(22) PCT Filed: Mar. 22, 2013

(86) PCT No.: PCT/JP2013/001971
§ 371 (c)(1),
(2) Date: Sep. 8, 2015

(87) PCT Pub. No.: WO2014/147669
PCT Pub. Date: Sep. 25, 2014

(65) Prior Publication Data
US 2016/0023547 A1    Jan. 28, 2016

(51) Int. Cl.
*B60K 11/06*    (2006.01)
*B60K 1/04*    (2006.01)
*B60K 11/08*    (2006.01)
*B60K 1/00*    (2006.01)

(52) U.S. Cl.
CPC .............. *B60K 11/06* (2013.01); *B60K 1/04* (2013.01); *B60K 11/08* (2013.01); *B60K 2001/005* (2013.01); *B60K 2001/0416* (2013.01); *B60K 2001/0438* (2013.01)

(58) Field of Classification Search
CPC  B60K 11/06; B60K 1/04; B60K 2001/0416; B60K 11/08; B60K 2001/0438; B60K 2001/005; B60L 11/1874
See application file for complete search history.

(56) References Cited

U.S. PATENT DOCUMENTS

| | | | |
|---|---|---|---|
| 5,937,664 A | 8/1999 | Matsuno et al. | |
| 6,808,552 B2* | 10/2004 | Borla | B01D 46/2403 210/448 |
| 7,654,351 B2* | 2/2010 | Koike | B60K 1/04 180/68.1 |
| 7,905,307 B2* | 3/2011 | Kubota | B60K 1/04 165/202 |

(Continued)

FOREIGN PATENT DOCUMENTS

| | | |
|---|---|---|
| JP | H10306722 A | 11/1998 |
| JP | 2001167804 A | 6/2001 |

(Continued)

*Primary Examiner* — J. Allen Shriver, II
*Assistant Examiner* — Brian Swenson
(74) *Attorney, Agent, or Firm* — Oliff PLC

(57) ABSTRACT

A temperature adjustment structures includes a first duct, a blower, and a second duct. The first duct includes an intake port. The blower is connected to the first duct and configured to take in air through the intake port. The blower is placed forward of an electric storage apparatus in the vehicle. The second duct is connected to the blower and the electric storage apparatus and configured to direct the air from the blower to the electric storage apparatus. The second duct extends downward in the vehicle from the blower toward the electric storage apparatus. The electric storage apparatus is housed in a recessed portion of a floor panel, and the recessed portion is located below a luggage compartment of the vehicle.

17 Claims, 4 Drawing Sheets

(56) References Cited

U.S. PATENT DOCUMENTS

| | | | | |
|---|---|---|---|---|
| 8,251,169 | B2* | 8/2012 | Fujiwara | H01M 2/1077 180/68.1 |
| 8,439,436 | B2* | 5/2013 | Kato | B60L 11/1874 297/180.1 |
| 8,794,361 | B2* | 8/2014 | Lim | B60K 1/04 180/68.1 |
| 2005/0056472 | A1* | 3/2005 | Smith | B60H 1/00278 180/68.1 |
| 2009/0152031 | A1* | 6/2009 | Lim | B60K 1/04 180/68.1 |
| 2011/0222240 | A1 | 9/2011 | Kawata et al. | |
| 2012/0181827 | A1* | 7/2012 | Aoki | B60K 1/04 297/217.3 |
| 2013/0000864 | A1* | 1/2013 | Yamatani | B60K 1/04 165/59 |
| 2013/0087303 | A1* | 4/2013 | Lim | B60K 1/04 165/41 |
| 2013/0146373 | A1* | 6/2013 | Kosaki | B60K 1/04 180/65.1 |
| 2013/0298586 | A1* | 11/2013 | Hwang | B60K 1/04 62/239 |
| 2013/0330587 | A1* | 12/2013 | Takahashi | H01M 2/1077 429/99 |
| 2015/0291054 | A1* | 10/2015 | Duan | B60L 11/1874 429/50 |
| 2015/0343891 | A1* | 12/2015 | Honda | B60K 1/04 180/68.1 |

FOREIGN PATENT DOCUMENTS

| | | |
|---|---|---|
| JP | 2004001683 A | 1/2004 |
| JP | 2006117096 A | 5/2006 |
| JP | 2008155878 A | 7/2008 |
| JP | 2010120397 A | 6/2010 |

* cited by examiner

TEMPERATURE ADJUSTMENT STRUCTURE

TECHNICAL FIELD

The present invention relates to a temperature adjustment structure mounted on a vehicle and configured to adjust the temperature of an electric storage apparatus.

BACKGROUND ART

Patent Document 1 has described a power source unit housed in a tire pan located below a luggage space.

PRIOR ART DOCUMENT

Patent Document

[Patent Document 1] Japanese Patent Laid-Open No. 2010-120397

DISCLOSURE OF THE INVENTION

Problems to be Solved by the Invention

The configuration described in Patent Document 1, by way of example, has room for improvement in allocating a sufficient luggage space (luggage compartment). For example, when a blower is located on a floor face of the luggage compartment, the area of the floor face is reduced by the space for placing the blower.

Means for Solving the Problems

A temperature adjustment structure according to the present invention is directed to adjust the temperature of an electric storage apparatus mounted on a vehicle. The electric storage apparatus is housed in a recessed portion formed in a floor panel of the vehicle, and the recessed portion is located below a luggage compartment of the vehicle. The temperature adjustment structure includes a first duct, a blower, and a second duct.

The first duct includes an intake port. The blower is connected to the first duct and configured to take in air through the intake port into the first duct. The blower is placed forward of the electric storage apparatus in the vehicle. The second duct is connected to the blower and the electric storage apparatus and configured to guide the air from the blower to the electric storage apparatus. The second duct extends downward in the vehicle from the blower toward the electric storage apparatus.

According to the present invention, the electric storage apparatus is housed in the recessed portion of the floor panel located below the luggage compartment, so that the electric storage apparatus can be prevented from protruding into the luggage compartment to allocate a sufficient space to the luggage compartment. Since the second duct extends downward in the vehicle, the blower can be placed at an upper position away from the floor face of the luggage compartment in the vehicle.

The floor face of the luggage compartment serves as a region where luggage is put. The placement of the blower at the position away from the floor face of the luggage compartment can allocate the sufficient area of the floor face. In the present invention, the blower is placed at the position away from the floor face of the luggage compartment, thereby substantially preventing the area of the floor face from being limited by the space for placing the blower.

The first duct and the blower can be placed along a side body of the vehicle. This can locate the first duct and the blower closer to the side of the luggage compartment to provide the sufficient space for the luggage compartment. When a suspension tower is provided at the periphery of the luggage compartment, the blower can be placed above the suspension tower in the vehicle. This can place the blower so as to avoid interference with the suspension tower.

If the blower is placed at a position adjacent to the suspension tower in a horizontal direction, the blower may protrude into the luggage compartment to limit the space of the luggage compartment. In the present invention, the suspension tower and the blower are placed in parallel in an up-down direction of the vehicle (vertical direction) to prevent the blower from significantly protruding into the luggage compartment. This can provide the sufficient space for the luggage compartment.

The intake port can be placed forward of the blower in the vehicle. The placement of the intake port forward of the blower in the vehicle can provide the intake port at a position away from the luggage compartment. If the intake port is provided rearward of the blower in the vehicle, the space of the luggage compartment tends to be limited by the intake port. According to the present invention, the placement of the intake port away from the luggage compartment can allocate the sufficient space to the luggage compartment.

The blower can be placed above the intake port in the vehicle. This allows the first duct to extend upward in the vehicle from the intake port toward the blower. Since the first duct extends upward in the vehicle, any foreign matter entering through the intake port can be returned to the intake port by the action of gravity. Then, the foreign matter can be let out through the intake port.

The electric storage apparatus can be placed below the intake port in the vehicle. The electric storage apparatus can be placed by using space below the intake port, and the sufficient space can be provided for the luggage compartment located above the electric storage apparatus.

The intake port can be provided at a position facing a passenger compartment. The passenger compartment corresponds to a space where a passenger rides. Air in the passenger compartment is likely to be set at a temperature suitable for adjusting the temperature of the electric storage apparatus by an air conditioner or the like installed on the vehicle. The air in the passenger compartment can be taken in through the intake port to efficiently perform the temperature adjustment of the electric storage apparatus.

A filter can be provided for the first duct. The filter can be used to block the movement of foreign matter and to allow the passage of the air within the first duct. Even when any foreign matter enters through the intake port, the foreign matter can be removed before it reaches the blower. The prevention of the foreign matter from reaching the blower can avoid any detrimental effect on the driving of the blower.

An end portion of the filter can be fixed to an inner wall face of the first duct. The filter can be formed in a shape protruding toward a direction in which the air moves. For example, the filter can be formed in a cone shape. The use of such a filter is likely to increase the area of the filter. Specifically, the filter can have a larger area as compared with a filter placed along a plane orthogonal to the direction in which the air moves. The larger area of the filter can have a larger area for removing foreign matter to delay the occurrence of clogging of the filter due to the foreign matter.

The vehicle can include a partition panel. The partition panel is part of a vehicle body and separates the passenger compartment from the luggage compartment. The first duct can pass through the partition panel. The first duct can be formed of a first sub-duct and a second sub-duct.

The first sub-duct includes the intake port and is placed on the side of the partition panel closer to the passenger compartment. The second sub-duct is connected to the first sub-duct and the blower. A connection port of the second sub-duct connected to the first sub-duct can be located inside the partition panel. The positioning of the connection port of the second sub-duct inside the partition panel allows an operator to access the connection port of the second sub-duct from the side of the passenger compartment.

Specifically, the operator can remove the first sub-duct from the side of the passenger compartment to check the connection port of the second sub-duct. When the filter is fixed to the connection port of the second sub-duct, the operator can easily access the filter. This facilitates the removal of foreign matter adhering to the filter. The foreign matter can be removed from the filter remaining fixed to the second sub-duct, or the foreign matter can be removed by replacing the filter.

The connection port of the second sub-duct can face toward the front of the vehicle. As described above, the operator accesses the connection port of the second sub-duct from the side of the passenger compartment. The connection port of the second sub-duct facing toward the front of the vehicle allows the operator to easily check the connection port of the second sub-duct. When the first duct is formed of the first sub-duct and the second sub-duct, the second sub-duct and the blower can be placed above the suspension tower of the vehicle.

The second sub-duct can be formed of a sound-absorbing material. The second sub-duct is connected to the blower and is placed on the side of the blower closer to the intake port. The use of the second sub-duct formed of the sound-absorbing material can attenuate the driving noise produced in the blower.

Thus, the driving noise of the blower reaching the intake port can be reduced. If the driving noise of the blower leaks out of the intake port, a passenger of the vehicle may be made uncomfortable, by way of example. The driving noise of the blower reaching the intake port can be reduced in the present invention to substantially prevent the passenger from feeling uncomfortable.

When the blower is placed above the suspension tower in the vehicle, the air moving path from the intake port to the blower and the air moving path from the blower to the electric storage apparatus tend to be longer. In such a configuration, the driving amount of the blower is often increased to provide a smooth air flow. This may inevitably increase the driving noise of the blower. To address this, the use of the second sub-duct formed of the sound-absorbing material can efficiently and substantially prevent the leak of the driving noise of the blower out of the intake port.

The second duct can be formed of a third sub-duct and a fourth sub-duct. The third sub-duct can be connected to the blower. The fourth sub-duct can be connected to the third sub-duct and the electric storage apparatus. A portion of the fourth sub-duct can be placed along a floor face of the luggage compartment. The third sub-duct can be formed in a twisted shape.

Specifically, when a connection port of the third sub-duct connected to the blower extends in a front-rear direction of the vehicle, the twisted shape of the third sub-duct allows a connection port of the third sub-duct connected to the fourth sub-duct to extend in a left-right direction of the vehicle. The twisted shape of the third sub-duct can change the orientation of the third sub-duct without changing the section area thereof. Thus, the third sub-duct can be placed so as not to protrude into the luggage compartment, thereby providing the sufficient space for the luggage compartment.

MODE FOR CARRYING OUT THE INVENTION

A preferred embodiment of the present invention will hereinafter be described.

Embodiment 1

Figure 1:
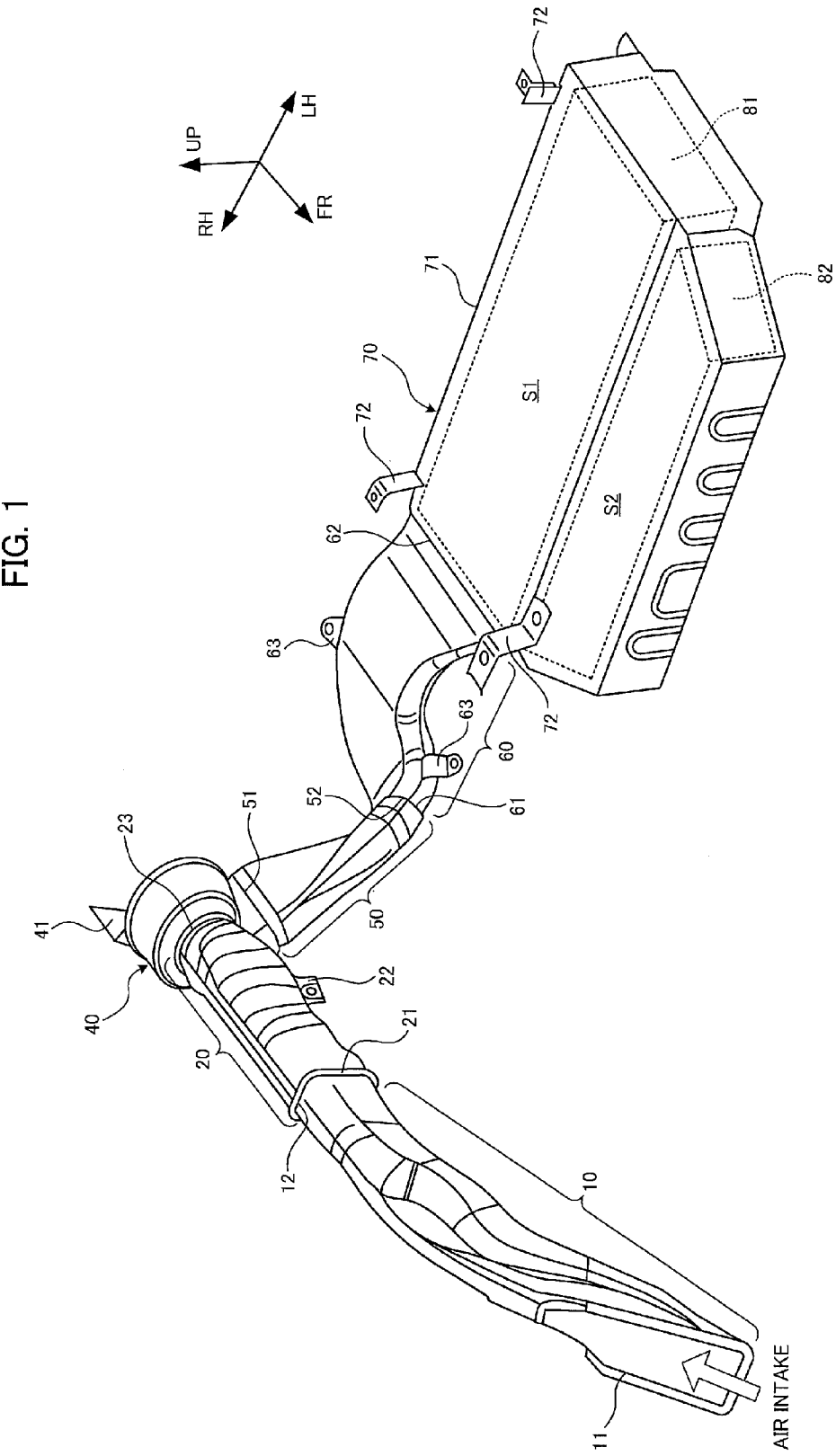
FIG. 1 is a perspective view of a temperature adjustment structure.
Figure 2:
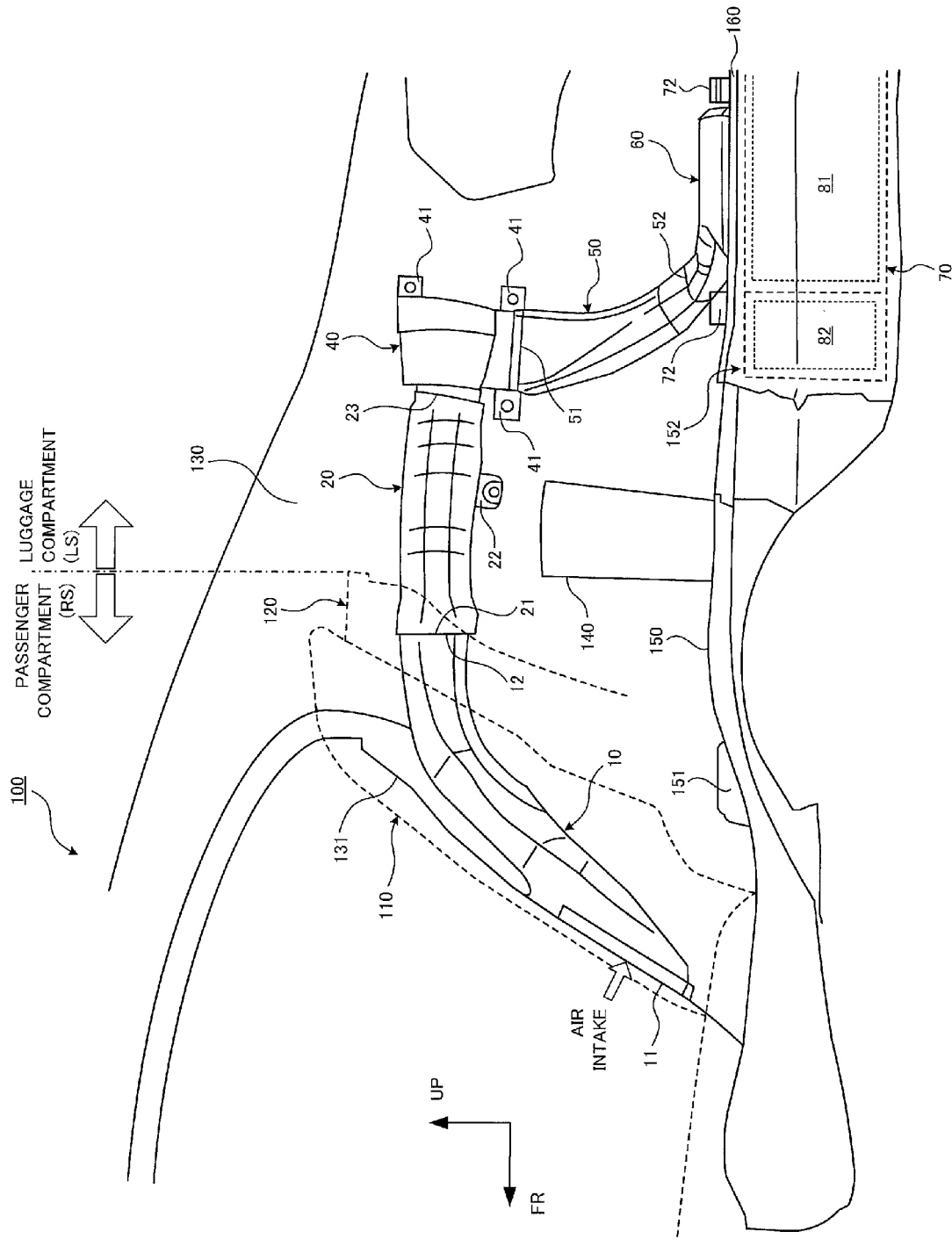
FIG. 2 is a side view of the temperature adjustment structure mounted on a vehicle.
Figure 3:
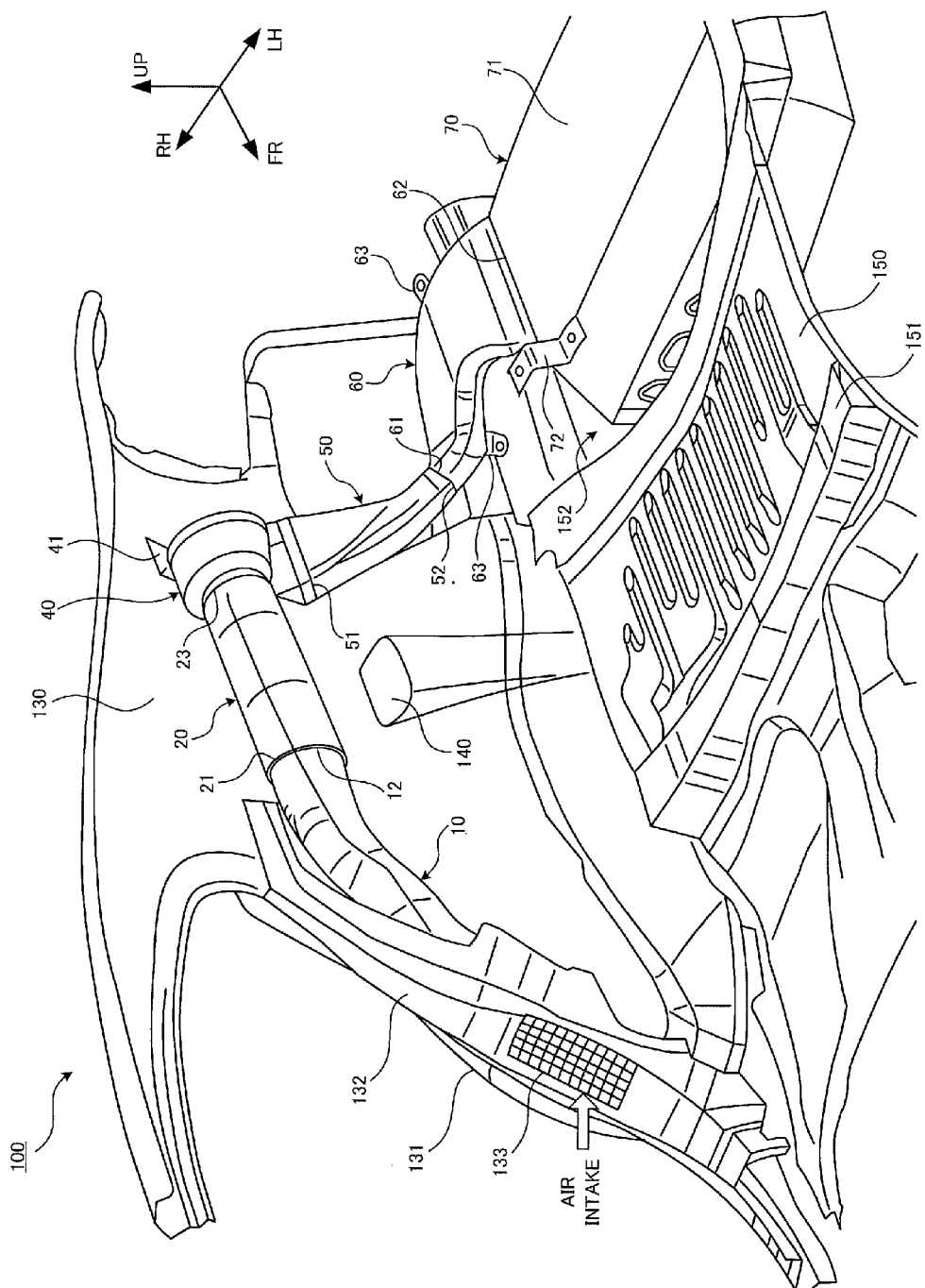
FIG. 3 is a perspective view of the temperature adjustment structure mounted on the vehicle.

A temperature adjustment structure which is Embodiment 1 of the present invention is described. FIG. 1 is a perspective view of the temperature adjustment structure. The temperature adjustment structure of the present embodiment is mounted on a vehicle and is used to adjust the temperature of a battery pack. FIG. 2 and FIG. 3 show the temperature adjustment structure mounted on the vehicle.

In FIG. 1 to FIG. 3, an arrow FR indicates a direction in which the vehicle runs forward, and an arrow UP indicates an upward direction of the vehicle. An arrow RH indicates a right direction when the vehicle faces in the direction of the arrow FR, and an arrow LH indicates a left direction when the vehicle faces in the direction of the arrow FR.

A first intake duct 10 has an intake port 11 at one end, and the intake port 11 faces a passenger compartment RS. The first intake duct 10 corresponds to a first duct or a first sub-duct in the present invention. Air in the passenger compartment RS can moves through the intake port 11 into the first intake duct 10. The passenger compartment RS refers to a space where a passenger rides. As shown in FIG. 2, a seat 110 is mounted in the passenger compartment RS and a partition panel 120 is mounted at the back of the seat 110.

The partition panel 120 is part of a vehicle body and is used to separate the passenger compartment RS from a luggage compartment LS. As shown in FIG. 2, the space located forward of the partition panel 120 (in the direction of the arrow FR) in the vehicle 100 corresponds to the passenger compartment RS. The space located rearward of the partition panel 120 in the vehicle 100 corresponds to the luggage compartment LS.

As shown in FIG. 2, the first intake duct 10 is placed at a position adjacent to the seat 110 in a left-right direction (the direction of the arrows RH and LH) of the vehicle 100. Specifically, the first intake duct 10 is placed between a side door and the seat 110. The first intake duct 10 extends upward from the position of the intake port 11 and is placed along an opening portion 131 of a side body 130. The opening portion 131 is covered with the side door.

As shown in FIG. 3, the first intake duct 10 is covered with a seat side garnish 132. An operator can access the first intake duct 10 by removing the seat side garnish 132. The intake port 11 of the first intake duct 10 is in contact with an inner wall face of the seat side garnish 132, and a grille 133 provided for the seat side garnish 132 and a part of the intake port 11 overlap with each other. The placement of the grille 133 on a front face of the intake port 11 can prevent the foreign matter from entering into the intake port 11.

Figure 4:
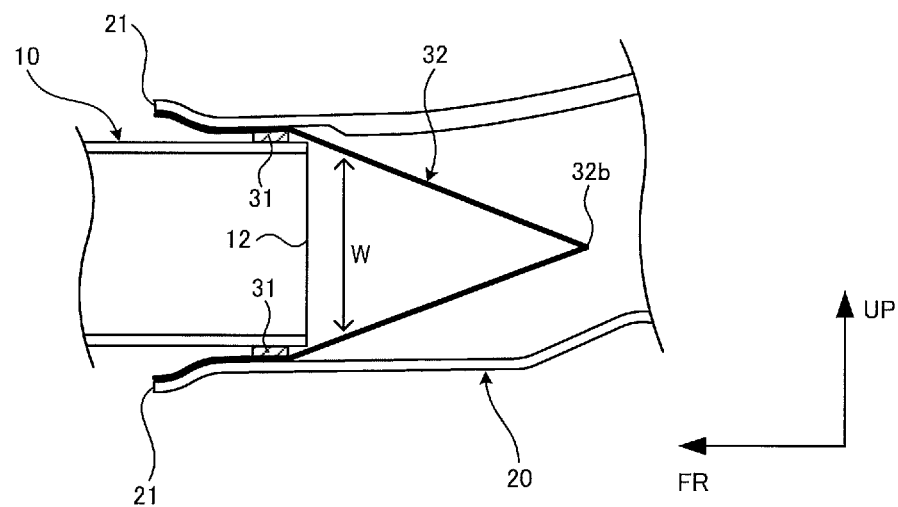
FIG. 4 is a section view showing a structure of connecting a first intake duct with a second intake duct.

A connection port 12 provided at the other end of the first intake duct 10 is connected to a second intake duct 20. The second intake duct 20 corresponds to the first duct or a second sub-duct in the present invention. As shown in FIG. 4, the connection port 12 of the first intake duct 10 is located inside a first connection port 21 of the second intake duct 20. In other words, the first intake duct 10 is inserted into the second intake duct 20.

As shown in FIG. 4, a seal member 31 is placed between an outer wall face of the first intake duct 10 and an inner wall face of the second intake duct 20. The seal member 31 is formed in a ring shape and is placed along the outer wall face of the first intake duct 10. The seal member 31 can be formed of an elastically deformable material such as rubber.

The placement of the seal member 31 between the first intake duct 10 and the second intake duct 20 can prevent any foreign matter from entering the first intake duct 10 or the second intake duct 20 through the connecting portion of the first intake duct 10 to the second intake duct 20. The seal member 31 can also prevent the air taken in through the intake port 11 from leaking out of the connecting portion of the first intake duct 10 to the second intake duct 20.

Although the first intake duct 10 is inserted into the second intake duct 20 in the present embodiment, the present invention is not limited thereto. It is only required that the first intake duct 10 and the second intake duct 20 should be able to be connected to each other. For example, the second intake duct 20 may be inserted into the first intake duct 10.

Figure 5:
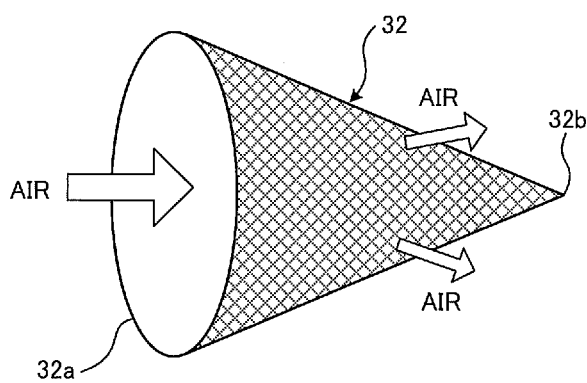
FIG. 5 is an external view of a filter.

A filter 32 is attached to the first connection port 21 of the second intake duct 20. The filter 32 is used to remove any foreign matter moving within the first intake duct 10 or the second intake duct 20. The filter 32 has a plurality of opening portions, and the opening area of each of the opening portions is designed to be smaller than the size of the foreign matter to be removed thereby. When the air taken in through the intake port 11 moves within the first intake duct 10 together with the foreign matter, the filter 32 blocks the movement of the foreign matter. As shown in FIG. 5, the air passes through the opening portions of the filter 32.

As shown in FIG. 5, the filter 32 is formed in a cone shape, and an opening end 32a of the filter 32 is attached to the first connection port 21 of the second intake duct 20. The filter 32 is formed in a shape protruding toward the direction in which the air moves (the right direction in FIG. 4). A tip 32b of the filter 32 is away from the connection port 12 of the first intake duct 10 and is located inside the second intake duct 20. When the filter 32 of the cone shape is used, the filter 32 has a width w (see FIG. 4) continuously reduced from the opening end 32a toward the tip 32b.

The seal member 31 can be used to fix the filter 32 to the inner wall face of the second intake duct 20. It is only required that the filter 32 should be fixed to the second intake duct 20, and how to fix the filter 32 to the second intake duct 20 can be set as appropriate.

Although the filter 32 is fixed to the second intake duct 20 in the present embodiment, the present invention is not limited thereto. Specifically, the filter 32 may be fixed to the first intake duct 10. The opening end 32a of the filter 32 may be fixed to an inner wall face or the outer wall face of the first intake duct 10.

Although the filter 32 is formed in the cone shape in the present embodiment, the present invention is not limited thereto. Specifically, it is only required that the filter 32 should be able to be used to remove the foreign matter moving in the first intake duct 10 or the second intake duct 20.

For example, the filter 32 may be formed in a shape conforming to a plane including the connection port 12 of the first intake duct 10. The filter 32 used to cover the connection port 12 in this manner can remove the foreign matter which would move from the first intake duct 10 into the second intake duct 20. The filter 32 formed in the cone shape can be used to increase the removable amount of foreign matter as compared with the filter 32 placed to conform to the plane including the connection port 12.

The filter 32 of the cone shape has a surface area larger than the surface area of the filter 32 of the flat shape, and can remove much foreign matter. Specifically, even in a situation where all the opening portions of the filter 32 of the flat shape are covered with foreign matter, the filter 32 of the cone shape has some of the opening portions remaining not covered with foreign matter. Thus, the air from the intake port 11 can pass through the opening portions of the filter 32 of the cone shape not covered with foreign matter.

As described above, to provide the sufficient surface area of the filter 32, the filter 32 shaped three-dimensionally is preferably used rather than the filter 32 of the flat shape. The filter 32 shaped three-dimensionally refers to the filter 32 formed in a shape protruding toward the moving direction of the air (the right direction in FIG. 4). It is only required that the filter 32 shaped three-dimensionally should bulge toward the moving direction of the air, and the cone shape as in the present embodiment is not essential.

Thus, the filter 32 can be formed in various three-dimensional shapes. Although the filter 32 used in the present embodiment has the width w (see FIG. 4) continuously reduced from the opening end 32a toward the tip 32b, the width w may be reduced stepwise.

The second intake duct 20 has a flange 22 which is used to fix the second intake duct 20 to the side body 130. Specifically, the flange 22 can be fixed to the side body 130 by using a fastening member to fix the second intake duct 20 to the side body 130. The position to provide the flange 22 and the number of flanges 22 can be set as appropriate. It is only required that the second intake duct 20 should be fixed to the side body 130.

The side body 130 is provided with a suspension tower 140. As shown in FIG. 2 and FIG. 3, the suspension tower 140 is placed forward of a battery pack 70, later described, in the vehicle 100. The second intake duct 20 is placed above the suspension tower 140 in the vehicle 100. The second intake duct 20 is placed at the periphery of the luggage compartment LS.

As shown in FIG. 2 and FIG. 3, the second intake duct 20 extends in a front-rear direction of the vehicle 100 (the direction of the arrow FR). As shown in FIG. 2, the first intake duct 10 and the second intake duct 20 pass through the partition panel 120. In other words, the partition panel 120 has an opening portion through which the first intake duct 10 and the second intake duct 20 pass. The first connection port 21 of the second intake duct 20 is located inside the partition panel 120.

As described above, when the seat side garnish 132 is removed and the first intake duct 10 is also removed, the first connection port 21 of the second intake duct 20 can be seen from the side of the passenger compartment RS. Since the filter 32 is attached to the first connection port 21 of the second intake duct 20, the operator can access the filter 32 from the side of the passenger compartment RS.

When foreign matter is accumulated on the filter 32, the operator can remove the foreign matter from the side of the passenger compartment RS. During the removal of the foreign matter, the filter 32 can remain attached to the second intake duct 20 and only the foreign matter can be removed. Alternatively, the foreign matter can be removed by replacing the filter 32 having the foreign matter accumulated thereon with a new filter 32.

Since the passenger compartment RS is the space where a passenger rides, the passenger compartment RS serves as a work space wide enough for the operator who handles the filter 32. The work of removing foreign matter is thus facilitated. Since the second intake duct 20 extends in the front-rear direction of the vehicle 100 in the present embodiment, the first connection port 21 of the second intake duct 20 faces toward the front of the vehicle 100.

The first connection port 21 of the second intake duct 20 faces toward the front of the vehicle 100 in this manner to allow the operator to easily see the first connection port 21 from the side of the passenger compartment RS. If the first connection port 21 of the second intake duct 20 faces toward the top or the bottom of the vehicle 100, the operator has difficulty in seeing the inside of the first connection port 21. Since the operator can easily see the first connection port 21 from the side of the passenger compartment RS in the present embodiment, the state of adhesion of foreign matter to the filter 32 can be checked with no difficulty.

When the filter 32 is attached to the connection port 12 of the first intake duct 10, the filter 32 can also be checked by removing the first intake duct 10. If foreign matter is accumulated on the filter 32, the foreign matter can be removed from the filter 32 remaining attached to the first intake duct 10, or the filter 32 can be replaced.

A blower 40 is connected to a second connection port 23 of the second intake duct 20. The blower 40 has a plurality of brackets 41 used to fix the blower 40 to the side body 130. The brackets 41 can be fixed to the side body 130 by using fastening members to fix the blower 40 to the side body 130. The number of the brackets 41 or the positions to provide the brackets 41 can be set as appropriate as long as the blower 40 can be fixed to the side body 130.

The blower 40 is located above the suspension tower 140 in the vehicle 100 and is placed at the periphery of the luggage compartment LS. The placement of the blower 40 above the suspension tower 140 can achieve the positioning of the blower 40 so as to avoid interference with the suspension tower 140. If the blower 40 is placed at a position adjacent to the suspension tower 140 in a horizontal direction, the blower 40 protrudes into the luggage compartment LS to limit the space of the luggage compartment LS.

If the blower 40 is placed at a position adjacent to the suspension tower 140 in the horizontal direction, the air moving path must be provided to avoid interference with the suspension tower 140, so that the air moving path is complicated.

In the present embodiment, the suspension tower 140 is provided forward of the battery pack 70 in the vehicle 100. In such a configuration, for example if the blower 40 is placed forward of the suspension tower 140 in the vehicle 100, a third intake duct 50 and a fourth intake duct 60 must be placed to avoid interference with the suspension tower 140. This tends to complicate the structures of the third intake duct 50 and the fourth intake duct 60.

If the blower 40 is placed rearward of the suspension tower 140 in the vehicle 100, the second intake duct 20 must be placed to avoid interference with the suspension tower 140. This tends to complicate the structure of the second intake duct 20.

The blower 40 is placed at an upper position away from the floor face of the luggage compartment LS in the vehicle 100. Luggage is put in the luggage compartment LS, and specifically, the luggage is put on the floor face of the luggage compartment LS. If the blower 40 is placed on the floor face of the luggage compartment LS, the floor area of the luggage compartment LS is limited by the space for placing the blower 40.

The placement of the blower 40 at the position away from the floor face of the luggage compartment LS as in the present embodiment can avoid the limitation of the floor area of the luggage compartment LS. In other words, the sufficient floor area of the luggage compartment LS is provided, and luggage is smoothly put in the luggage compartment LS.

The third intake duct 50 is connected to the blower 40. Specifically, a first connection port 51 of the third intake duct 50 is connected to the blower 40. The third intake duct 50 corresponds to a second duct or a third sub-duct in the present invention. The first connection port 51 is formed in a rectangular shape, and the longitudinal direction of the first connection port 51 corresponds to the front-rear direction of the vehicle 100 (the direction of the arrow FR).

Thus, the length of the first connection port 51 in the left-right direction of the vehicle 100 is smaller than the length of the first connection port 51 in the front-rear direction of the vehicle 100. This shape of the first connection port 51 can eliminate any protrusion of the first connection port 51 toward the luggage compartment LS to provide the sufficient space for the luggage compartment LS.

The third intake duct 50 is located below the blower 40 and extends in the up-down direction of the vehicle 100. In other words, the third intake duct 50 extends from the blower 40 toward the bottom of the vehicle 100. Since the third intake duct 50 is placed along the side body 130, the third intake duct 50 can be prevented from significantly protruding into the luggage compartment LS. This can provide the sufficient space for the luggage compartment LS.

The third intake duct 50 has a twisted shape. The twisted shape of the third intake duct 50 can change the orientation of the third intake duct 50 without changing the section area thereof. In other words, the orientation of the third intake duct 50 can be changed with the area of the opening of the first connection port 51 maintained.

A second connection port 52 of the third intake duct 50 is connected to a first connection port 61 of the fourth intake duct 60. The fourth intake duct 60 corresponds to the second duct or a fourth sub-duct in the present invention. The second connection port 52 is formed in a rectangular shape, and the longitudinal direction of the second connection port 52 corresponds to the left-right direction of the vehicle 100 (the direction of the arrows RH and LH). Since the first connection port 61 is connected to the second connection port 52, the first connection port 61 is also formed in a rectangular shape, and the longitudinal direction of the first connection port 61 corresponds to the left-right direction of the vehicle 100.

The fourth intake duct 60 in a bent state is placed along the floor face of the luggage compartment LS. Specifically, the fourth intake duct 60 extends from the first connection port 61 toward the back of the vehicle 100 and then is turned by bending to extend in the left-right direction of the vehicle 100 (the direction of the arrow LH). A second connection port 62 of the fourth intake duct 60 is connected to a pack case 71 of the battery pack 70.

For connecting the fourth intake duct 60 to the pack case 71, the second connection port 62 needs to have a sufficient length in the front-rear direction of the vehicle 100. The connecting portion of the fourth intake duct 60 to the pack case 71 is located rearward of the blower 40 in the vehicle 100. Thus, the intake ducts 50 and 60 having the shapes described above can be used to reliably provide the path of air from the blower 40 to the pack case 71 without reducing the section areas of the intake ducts 50 and 60.

The fourth intake duct 60 has a plurality of flanges 63 used to fix the fourth intake duct 60 to a floor panel 150. The flanges 63 can be fixed to the floor panel 150 by using fastening members to fix the fourth intake duct 60 to the floor panel 150. The number of the flanges 63 and the positions to provide the flanges 63 can be set as appropriate as long as the fourth intake duct 60 can be fixed to the floor panel 150.

The second intake duct 20, the blower 40, the third intake duct 50, and the fourth intake duct 60 are placed at the periphery of the luggage compartment LS and covered with a rear side garnish (not shown). This can prevent the second intake duct 20, the blower 40, the third intake duct 50, and the fourth intake duct 60 from being exposed to the luggage compartment LS.

A side member 151 is provided for the floor panel 150. As shown in FIG. 2, the seat 110 is placed forward of the side member 151 in the vehicle 100 (in the direction of the arrow FR). The seat 110 is fixed to the floor panel 150. The floor panel 150 has a recessed portion 152. The recessed portion 152 is located below the luggage compartment LS. The recessed portion 152 houses the battery pack 70, and a deck board 160 is placed on an upper face of the battery pack 70 as shown in FIG. 2. The deck board 160 serves as the floor face of the luggage compartment LS.

As shown in FIG. 1, the interior of the pack case 71 is divided into two spaces S1 and S2. The space S1 and S2 are placed in parallel in the front-rear direction of the vehicle 100 (the direction of the arrow FR). An assembled battery (corresponding to an electric storage apparatus in the present invention) 81 is placed in the space S1. The second connection port 62 of the fourth intake duct 60 is connected to the space S1 of the pack case 71. This can guide the air moving through the fourth intake duct 60 into the assembled battery 81.

The assembled battery 81 outputs an energy for use in running of the vehicle 100. Specifically, the electric energy output from the assembled battery 81 is converted into a kinetic energy by a motor generator, and the kinetic energy can be used to run the vehicle 100. A kinetic energy produced in braking of the vehicle 100 is converted into an electric energy by the motor generator, and the electric energy (regenerative power) can be accumulated in the assembled battery 81.

The assembled battery 81 has a plurality of cells. The plurality of cells can be connected electrically in series to constitute the assembled battery 81. The assembled battery 81 may include a plurality of cells connected electrically in parallel.

A secondary battery such as a nickel metal hydride battery and a lithium-ion battery can be used as the cell. Instead of the secondary battery, an electric double layer capacitor can be used. The shape of the cell can be selected as appropriate, and for example, a cylinder-type cell or a square-type cell can be used. The cylinder-type cell is a cell having an outer shape conforming to a cylinder, and the square-type cell is a cell having an outer shape conforming to a rectangle.

Electronic equipment 82 for use in controlling the charge and discharge of the assembled battery 81 is placed in the space S2.

Examples of the electronic equipment 82 include a system main relay, a current sensor, a voltage monitor unit, and a service plug. The system main relay connects the assembled battery 81 with a load or breaks the connection between the assembled battery 81 and the load. A motor generator can be used as the load, for example.

The current sensor detects the value of current flowing through the assembled battery 81. The voltage monitor unit detects the value of voltage in the assembled battery 81 or detects the value of voltage in each of the cells constituting the assembled battery 81. The service plug is used to cut off a current path in the assembled battery 81. An operator can cut off the current path in the assembled battery 81 by removing the service plug. This allows the operator to perform an inspection of the assembled battery 81 or the like while the current path in the assembled battery 81 is cut off. When the operator attaches the service plug, the current path in the assembled battery 81 is established.

A plurality of brackets 72 are provided on an upper face of the battery pack 70. The brackets 72 are used to fix the battery pack 70 to the floor panel 150. Specifically, the brackets 72 can be fixed to the floor panel 150 by using fastening members to fix the battery pack 70 to the floor panel 150. The positions to provide the brackets 72 and the number of the brackets 72 can be set as appropriate as long as the battery pack 70 can be fixed to the floor panel 150.

Next, the operation of the temperature adjustment structure of the present embodiment is described.

When the blower 40 is driven, the air in the passenger compartment RS passes through the intake port 11 and is taken into the first intake duct 10. The air passes through the first intake duct 10, then moves through the second intake duct 20, and is directed to the blower 40. Any foreign matter contained in the air is removed by the filter 32 provided at the connecting portion of the first intake duct 10 to the second intake duct 20.

The air passes through the blower 40, moves through the third intake duct 50 and the fourth intake duct 60, and is directed to the pack case 71. The air from the fourth intake duct 60 is directed to the space S1 of the pack case 71. Since the assembled battery 81 is placed in the space S1, the air directed to the space S1 comes into contact with the assembled battery 81. The contact of the air with the assembled battery 81 achieves heat exchange between the air and the assembled battery 81 to allow the adjustment of the temperature of the assembled battery 81 (cells).

For example, when the temperature of the assembled battery 81 rises due to charge or discharge, air for cooling can be used to limit the temperature rise in the assembled battery 81. When the assembled battery 81 is extremely cooled due to the ambient temperature or the like, air for heating can be used to limit the temperature drop in the assembled battery 81.

The air present in the passenger compartment RS is set at a temperature suitable for adjusting the temperature of the assembled battery 81 by an air conditioner or the like installed on the vehicle. Thus, the supply of the air in the passenger compartment RS to the assembled battery 81 can conveniently adjust the temperature of the assembled battery 81. The temperature adjustment of the assembled battery 81 can maintain the temperature of the assembled battery 81 within a desired temperature range to reduce degradation in input/output performance of the assembled battery 81.

An exhaust duct can be connected to the pack case 71. The exhaust duct can be used to allow the air after the heat exchange with the assembled battery 81 to be discharged to the outside of the pack case 71. The air directed to the exhaust duct can be discharged to the outside of the vehicle 100 or can be directed to the inside of the vehicle 100. The inside of the vehicle 100 refers to the luggage compartment LS or the passenger compartment RS, for example.

Alternatively, only an exhaust port can be provided for the pack case 71 instead of the exhaust duct connected to the pack case 71. In this case, the exhaust port can be used to allow the air after the heat exchange to be discharged to the outside of the pack case 71.

Although the blower 40 is placed on the path for supplying the air to the pack case 71 in the present embodiment, it is also contemplated that the blower may be placed on the path for discharging the air from the pack case 71. In this case, however, the path from the intake port 11 to the blower tends to be longer, which requires an increased driving amount of the blower at the beginning of the taking in of the air from the intake port 11. This increases the power consumption involved in the driving of the blower.

If the blower is placed on the air discharge path, hermeticity must be ensured in the air supply path in order to efficiently guide the air from the intake port 11 to the pack case 71. Since the blower 40 is placed on the air supply path in the present embodiment, the blower 40 can push out the air to facilitate the movement of the air to the pack case 71. When the blower 40 pushes out the air, the air flow produced from the blower 40 can smoothly move the air to the pack case 71 without ensuring the hermeticity in the third intake duct 50 and the fourth intake duct 60.

As shown in FIG. 2 and FIG. 3, the blower 40 is placed at the upper position away from the battery pack 70 in the vehicle 100. The blower 40 is also located forward of the assembled battery 81 in the vehicle 100 (in the direction of the arrow FR). Specifically, the rearmost end of the blower 40 is located forward of the foremost end of the assembled battery 81 in the vehicle 100.

The placement of the blower 40 forward of the assembled battery 81 in the vehicle 100 allows the blower 40 to be located closer to the front of the vehicle 100. This can reduce the interference of luggage put in the luggage compartment LS with the blower 40. For putting luggage in the luggage compartment LS, the luggage is moved into the luggage compartment LS from a rear end portion of the vehicle 100.

If the luggage compartment LS is used in this manner and the blower 40 is placed rearward of the assembled battery 81 in the vehicle 100, the luggage to be put in the luggage compartment LS is likely to interfere with the blower 40. According to the present embodiment, the blower 40 is placed away from the position from which the luggage is put, so that the luggage is easily put into and pull out of the luggage compartment LS.

In the temperature adjustment structure of the present embodiment, the blower 40 is placed at the highest position in the up-down direction of the vehicle 100 (the direction of the arrow UP), and the intake port 11 is provided at a position lower than the blower 40. The battery pack 70 is placed at a position lower than the intake port 11. Since the battery pack 70 is housed in the recessed portion 152 of the floor panel 150 in the present embodiment, the battery pack 70 can be placed at the position lower than the intake port 11.

Since the blower 40 is placed at the position higher than the intake port 11, the air taken in through the intake port 11 is moved upward in the vehicle 100 and directed into the blower 40. Even when foreign matter enters through the intake port 11, the foreign matter can be substantially prevented from reaching the blower 40. Specifically, even when foreign matter enters the first intake duct 10 through the intake port 11, the foreign matter is moved downward in the vehicle 100 (in other words, in the direction approaching the intake port 11) by the action of gravity. Thus, the foreign matter entering through the intake port 11 can be let out through the intake port 11.

Since the foreign matter is substantially prevented from reaching the blower 40 in this manner, any degradation of the performance of the blower 40 or a failure of the blower 40 due to the foreign matter can be avoided. The foreign matter includes a liquid body or a solid body.

Since the intake port 11 is located between the side door and the seat 110 in the present embodiment, foreign matter may enter through the intake port 11, for example when the side door is opened. In that situation where foreign matter easily enters through the intake port 11, the blower 40 can be placed above the intake port 11 such that foreign matter, if enters through the intake port 11, can be let out through the intake port 11 and substantially prevented from reaching the blower 40.

In the present embodiment, the intake port 11 is placed forward of the blower 40 in the vehicle 100. This allows the placement of the first intake duct 10 and the second intake duct 20 forward of the blower 40 in the vehicle 100 to allocate the sufficient space to the luggage compartment LS. The intake port 11 may be placed rearward of the blower 40 in the vehicle 100, but in this case, the air path from the intake port 11 to the blower 40 is located at the periphery of the luggage compartment LS.

If the air path is placed at the periphery of the luggage compartment LS, the luggage compartment LS tends to be limited by the space for forming the air path. To address this, the intake port 11 can be provided forward of the blower 40 in the vehicle 100 as in the present embodiment to prevent primarily the first intake duct 10 from being placed at the periphery of the luggage compartment LS, thereby allocating the sufficient space to the luggage compartment LS.

The second intake duct 20 can be formed of a sound-absorbing material. A known material (for example, felt) can be selected as appropriate for the sound-absorbing material. The second intake duct 20 is located between the blower 40 and the intake port 11 on the air moving path. The use of the second intake duct 20 made of the sound-absorbing material can reduce the driving noise produced in the blower 40 reaching the intake port 11. In other words, the driving noise produced in the blower 40 can be attenuated in the second intake duct 20.

Since the intake port 11 faces the passenger compartment RS, the driving noise of the blower 40 leaking from the intake port 11 may make the passenger in the passenger compartment RS uncomfortable. Since the second intake duct 20 reduces the driving noise of the blower 40 reaching the intake port 11 in the present embodiment, the leakage of the driving noise of the blower 40 out of the intake port 11 can be reduced.

It is contemplated that the first intake duct 10 and the second intake duct 20 may be placed below the seat 110. Below the seat 110, however, an apparatus for driving the seat 110 (a so-called reclining apparatus) or a fuel tank may be mounted. For this reason, the first intake duct 10 or the second intake duct 20 is unlikely to be placed below the seat 110, and it is preferable to place the first intake duct 10 and the second intake duct 20 as in the present embodiment.

Although the intake port 11 faces the passenger compartment RS in the present embodiment, the present invention is not limited thereto. Specifically, the intake port 11 may faces the luggage compartment LS. In this case, the intake port 11 takes in air present in the luggage compartment LS, and the air in the luggage compartment LS can be used to adjust the temperature of the assembled battery 81.

In this case, similarly to the present embodiment, the first intake duct 10 can extend upward from the intake port 11. The second intake duct 20 can extend in the front-rear direction of the vehicle 100. In such a configuration, the first intake duct 10 can be removed to check the first connection port 21 of the second intake duct 20 from the side of the luggage compartment LS. Then, the work of removing foreign matter accumulated on the filter 32 can be performed from the side of the luggage compartment LS.

Although the first intake duct 10 and the second intake duct 20 are formed as separate members in the present embodiment, the first intake duct 10 and the second intake duct 20 may be formed as an one-piece duct. For providing the filter 32, the first intake duct 10 and the second intake duct 20 are preferably formed as separate members as in the present embodiment. When the filter 32 is omitted, the first intake duct 10 and the second intake duct 20 can be formed integrally.

Although the third intake duct 50 and the fourth intake duct 60 are formed as separate members in the present embodiment, the third intake duct 50 and the fourth intake duct 60 may be formed as an one-piece duct. Due to the twisted shape of the third intake duct 50, however, the independent configuration of the third intake duct 50 and the fourth intake duct 60 facilitates the manufacture of each of the third intake duct 50 and the fourth intake duct 60.

The invention claimed is:

1. A temperature adjustment structure comprising:
an electric storage apparatus that is housed in a recessed portion of a floor panel located below a luggage compartment of a vehicle;
a first duct that includes an intake port;
a blower that is placed forward of the electric storage apparatus in the vehicle, connected to the first duct, and configured to take in air through the intake port;
a second duct that is connected to the blower and the electric storage apparatus, extends downward in the vehicle from the blower toward the electric storage apparatus, and is configured to direct the air from the blower to the electric storage apparatus; and
a filter provided for the first duct and configured to block movement of foreign matter and to allow passage of the air within the first duct, wherein:
the filter has an end portion fixed to an inner wall face of the first duct, and
the filter is formed in a shape protruding toward a downstream of the airflow.

2. A temperature adjustment structure comprising:
an electric storage apparatus that is housed in a recessed portion of a floor panel located below a luggage compartment of a vehicle;
a first duct that includes an intake port;
a blower that is placed forward of the electric storage apparatus in the vehicle, connected to the first duct, and configured to take in air through the intake port;
a second duct that is connected to the blower and the electric storage apparatus, extends downward in the vehicle from the blower toward the electric storage apparatus, and is configured to direct the air from the blower to the electric storage apparatus; and
a filter provided for the first duct and configured to block movement of foreign matter and to allow passage of the air within the first duct, wherein:
the vehicle includes a partition panel separating a passenger compartment where a passenger rides from the luggage compartment, the first duct passing through the partition panel,
the first duct includes:
a first sub-duct including the intake port and placed on a side of the partition panel closer to the passenger compartment; and
a second sub-duct connected to the first sub-duct and the blower and having a connection port to the first sub-duct, the connection port being located inside the partition panel, and
the filter is fixed to the connection port of the second sub-duct.

3. The temperature adjustment structure according to claim 2, wherein the first duct and the blower are placed along a side body of the vehicle.

4. The temperature adjustment structure according to claim 2, wherein the blower is placed above a suspension tower of the vehicle in the vehicle.

5. The temperature adjustment structure according to claim 2, wherein the intake port is placed forward of the blower in the vehicle.

6. The temperature adjustment structure according to claim 2, wherein the blower is placed above the intake port in the vehicle, and
the electric storage apparatus is placed below the intake port in the vehicle.

7. The temperature adjustment structure according to claim 2, wherein the intake port faces a passenger compartment where a passenger rides.

8. The temperature adjustment structure according to claim 2, wherein the connection port of the second sub-duct faces toward the front of the vehicle.

9. The temperature adjustment structure according to claim 2, wherein the second sub-duct and the blower are placed above the suspension tower of the vehicle in the vehicle.

10. The temperature adjustment structure according to claim 2, wherein the second sub-duct is formed of a sound-absorbing material.

11. A temperature adjustment structure comprising:
an electric storage apparatus that is housed in a recessed portion of a floor panel located below a luggage compartment of a vehicle;
a first duct that includes an intake port;
a blower that is placed forward of the electric storage apparatus in the vehicle, connected to the first duct, and configured to take in air through the intake port; and
a second duct that is connected to the blower and the electric storage apparatus extends downward in the vehicle from the blower toward the electric storage apparatus, and is configured to direct the air from the blower to the electric storage apparatus, wherein:
the second duct includes:
a third sub-duct connected to the blower; and
a fourth sub-duct connected to the third sub-duct and the electric storage apparatus and having a portion placed along a floor face of the luggage compartment, and
the third sub-duct is twisted such that a connection port of the third sub-duct connected to the blower extends in a front-rear direction of the vehicle and a connection port of the third sub-duct connected to the fourth sub-duct extends in a left-right direction of the vehicle.

12. The temperature adjustment structure according to claim 11, further comprising a filter provided for the first duct and configured to block movement of foreign matter and to allow passage of the air within the first duct.

13. The temperature adjustment structure according to claim 11, wherein the first duct and the blower are placed along a side body of the vehicle.

14. The temperature adjustment structure according to claim 11, wherein the blower is placed above a suspension tower of the vehicle in the vehicle.

15. The temperature adjustment structure according to claim 11, wherein the intake port is placed forward of the blower in the vehicle.

16. The temperature adjustment structure according to claim 11, wherein the blower is placed above the intake port in the vehicle, and the electric storage apparatus is placed below the intake port in the vehicle.

17. The temperature adjustment structure according to claim 11, wherein the intake port faces a passenger compartment where a passenger rides.

* * * * *